United States Patent
Kowalkowski et al.

(10) Patent No.: US 8,631,690 B2
(45) Date of Patent: Jan. 21, 2014

(54) EXHAUST TREATMENT METHODS AND SYSTEMS

(75) Inventors: Janean E. Kowalkowski, Northville, MI (US); John Coppola, Canadice, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/596,245

(22) Filed: Aug. 28, 2012

(65) Prior Publication Data

US 2013/0104637 A1   May 2, 2013

Related U.S. Application Data

(60) Provisional application No. 61/552,748, filed on Oct. 28, 2011.

(51) Int. Cl.
*G01M 15/10* (2006.01)
(52) U.S. Cl.
USPC ..................... 73/114.71; 73/114.75
(58) Field of Classification Search
USPC ............... 73/114.69, 114.71, 114.75
See application file for complete search history.

(56) References Cited

U.S. PATENT DOCUMENTS

| | | | |
|---|---|---|---|
| 8,181,451 B2 * | 5/2012 | VanderVeen et al. | 60/295 |
| 8,250,913 B2 * | 8/2012 | Lee et al. | 73/114.75 |
| 8,353,202 B2 * | 1/2013 | Thompson et al. | 73/114.75 |
| 8,387,368 B2 * | 3/2013 | Parmentier et al. | 60/286 |
| 2010/0122526 A1 * | 5/2010 | Vanderveen et al. | 60/286 |
| 2010/0154386 A1 * | 6/2010 | Perrin et al. | 60/277 |
| 2011/0023456 A1 * | 2/2011 | Levijoki et al. | 60/274 |
| 2011/0061363 A1 * | 3/2011 | Levijoki et al. | 60/273 |
| 2011/0061372 A1 * | 3/2011 | Levijoki et al. | 60/286 |
| 2012/0280819 A1 * | 11/2012 | Kowalkowski et al. | 340/633 |

* cited by examiner

*Primary Examiner* — Freddie Kirkland, III
(74) *Attorney, Agent, or Firm* — Cantor Colburn LLP

(57) ABSTRACT

A control method for monitoring a selective catalytic reduction ("SCR") device is provided. A control method includes adjusting an existing efficiency threshold based on a dosing adaptation value to determine an efficiency threshold. The dosing adaptation value represents an adjusted value of a supply of reductant based on a determined deviation of a downstream NOx concentration value to an expected NOx concentration. The control method includes comparing the efficiency threshold with a determined efficiency of the SCR device. The control method includes generating a message based on comparing the efficiency threshold with the determined efficiency of the SCR device.

20 Claims, 3 Drawing Sheets

EXHAUST TREATMENT METHODS AND SYSTEMS

CROSS-REFERENCE TO RELATED APPLICATIONS

This patent application claims priority to U.S. Provisional Patent Application Ser. No. 61/552,748, filed Oct. 28, 2011, which is incorporated herein by reference in its entirety.

FIELD OF THE INVENTION

The subject invention relates to control methods and systems for exhaust systems, and more particularly to control methods and systems for controlling the reduction of exhaust constituents in exhaust systems.

BACKGROUND

Exhaust gas emitted from an internal combustion engine, for example, a diesel engine, is a heterogeneous mixture that contains gaseous emissions such as carbon monoxide (CO), unburned hydrocarbons (HC) and oxides of nitrogen (NOx) as well as condensed phase materials (liquids and solids) that constitute particulate matter. Catalyst compositions typically disposed on catalyst supports or substrates are provided in an engine exhaust system to convert certain, or all of these exhaust constituents into non-regulated exhaust gas components.

In some cases, one or more selective catalytic reduction (SCR) devices are provided to reduce the amount of NOx in the exhaust. The SCR devices make use of ammonia ($NH_3$) or other reductant to reduce the NOx. For example, when the proper amount of $NH_3$ is available at the SCR device under the proper conditions, the $NH_3$ reacts with the NOx in the presence of an SCR catalyst to reduce the NOx emissions to, for example, nitrogen.

Accordingly, it is desirable to provide systems and methods for controlling and monitoring the efficiency of the SCR device.

SUMMARY OF THE INVENTION

In one exemplary embodiment, a control method for monitoring a selective catalytic reduction ("SCR") device is provided. A control method includes adjusting an existing efficiency threshold based on a dosing adaptation value to determine an efficiency threshold. The dosing adaptation value represents an adjusted value of a supply of reductant based on a determined deviation of a downstream NOx concentration value to an expected NOx concentration. The control method includes comparing the efficiency threshold with a determined efficiency of the SCR device. The control method includes generating a message based on comparing the efficiency threshold with the determined efficiency of the SCR device.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
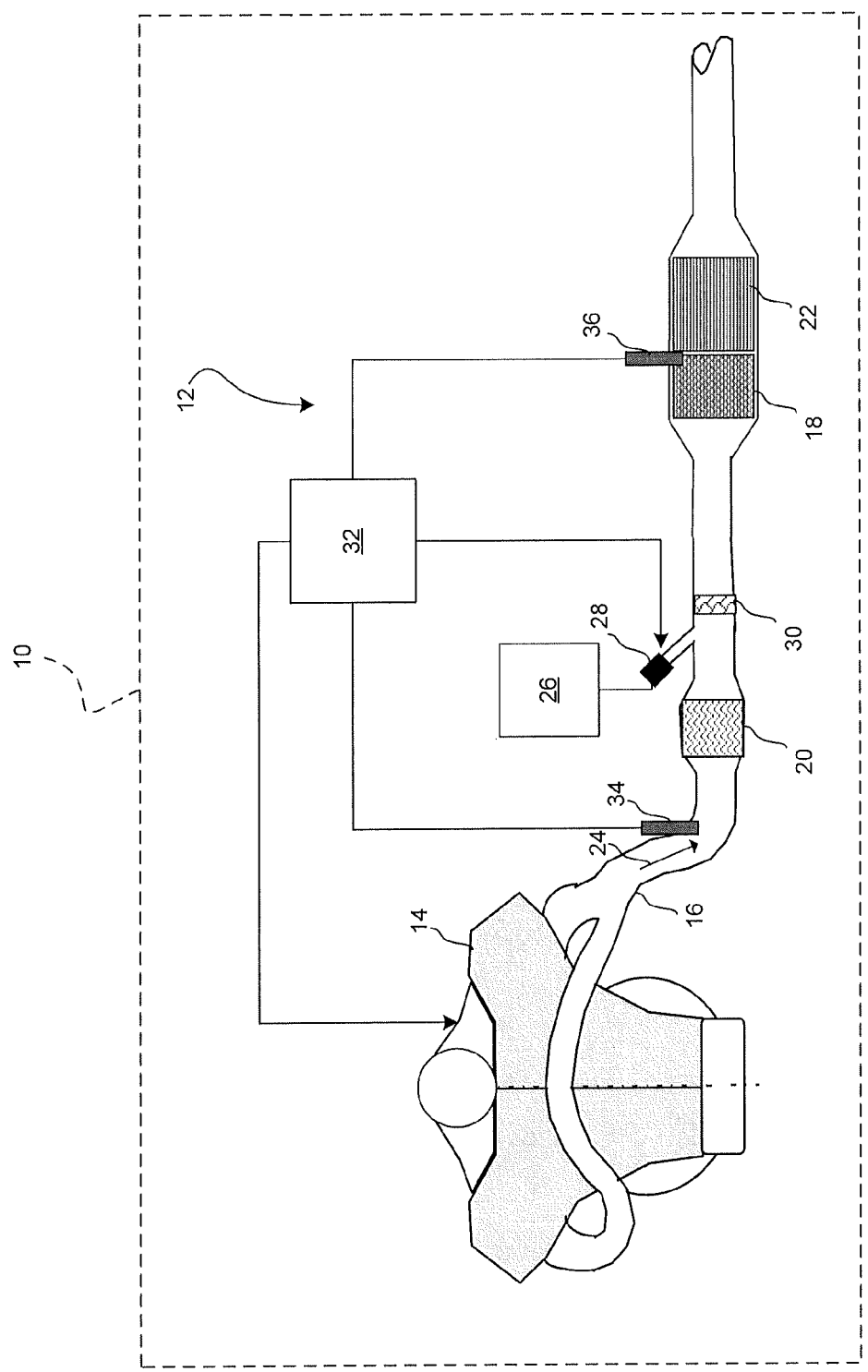
FIG. 1 is a functional block diagram of a vehicle that includes and exhaust treatment system in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to a vehicle 10 that includes an exhaust treatment system 12 for the reduction of regulated exhaust gas constituents of an internal combustion engine 14. As can be appreciated, the exhaust treatment system 12 described herein can be implemented in various engine systems. Such engine systems may include, for example, but are not limited to, diesel engines, gasoline engines, and homogeneous charge compression ignition engine systems.

As shown in FIG. 1, the exhaust treatment system 12 generally includes one or more exhaust gas conduits 16, and one or more exhaust treatment devices. The exhaust treatment devices include a selective catalytic reduction device (SCR) 18. In the example of FIG. 1, the exhaust treatment devices further include an oxidation catalyst device (OC) 20 and a particulate filter (PF) 22. As can be appreciated, the exhaust treatment system 12 of the present disclosure may include various combinations of the SCR 18 and other exhaust treatment devices and is not limited to the present example.

In FIG. 1, the exhaust gas conduit 16, which may comprise several segments, transports exhaust gas 24 from the engine 14 to the exhaust treatment devices of the exhaust treatment system 12. The SCR 18 may be disposed downstream of the engine 14. The SCR operates to reduce the oxides of nitrogen ($NO_x$) in the exhaust gas 24. The SCR 18 may be constructed with a flow-through ceramic or metal monolith substrate which is packaged in a rigid shell or canister having an inlet and an outlet in fluid communication with the exhaust gas conduit 16. The substrate may include a $NO_x$ reducing catalyst composition such as an SCR catalyst composition applied thereto. The SCR catalyst composition may include a zeolite and one or more base metal components such as iron (Fe), cobalt (Co), copper (Cu) or vanadium (V) that can operate efficiently to convert $NO_x$ constituents in the exhaust gas 24 in the presence of a reductant such as ammonia ($NH_3$).

The reductant, such as ammonia ($NH_3$), may be supplied from a reductant supply source 26 and may be injected into the exhaust gas conduit 16 at a location upstream of the SCR 18 using an injector 28, or other suitable method of delivery of the reductant to the exhaust gas 24. The reductant may be in the form of a gas, a liquid, or an aqueous urea solution and may be mixed with air in the injector 28 to aid in the dispersion of the injected spray. A mixer or turbulator 30 may also be disposed within the exhaust conduit 16 in close proximity to the injector 28 to further assist in thorough mixing of the reductant with the exhaust gas 24.

A control module 32 controls the engine 14 and one or more components of the exhaust treatment system 12 based on sensed and/or modeled data. For example, an upstream NOx sensor 34 and a downstream NOx sensor 36 detect a level of NOx in the exhaust gas 24 at various locations in the exhaust system 12. The upstream NOx sensor 34 measures a level of NOx in the exhaust gas 24 at a location upstream of the SCR 18 and generates a sensor signal based thereon. The downstream NOx sensor 36 measures a level of NOx in the exhaust gas 24 at a location downstream of the SCR 18 and generates a sensor signal based thereon.

The control module 32 receives the signals and monitors the operation of the SCR 18 based on the SCR monitoring systems and methods of the present disclosure. In various embodiments, the control module 32 monitors the operation of the SCR 18 based on an efficiency threshold. The efficiency threshold takes into account a controlled adjustment of the supply of reductant to the exhaust system 12. The control module 32 can set a diagnostic code based on the monitoring of the SCR 18. The control module 32 can further report the diagnostic code according to various reporting methods, including, but not limited to, using in-vehicle communication reporting messages and/or off-vehicle reporting messages.

Figure 2:
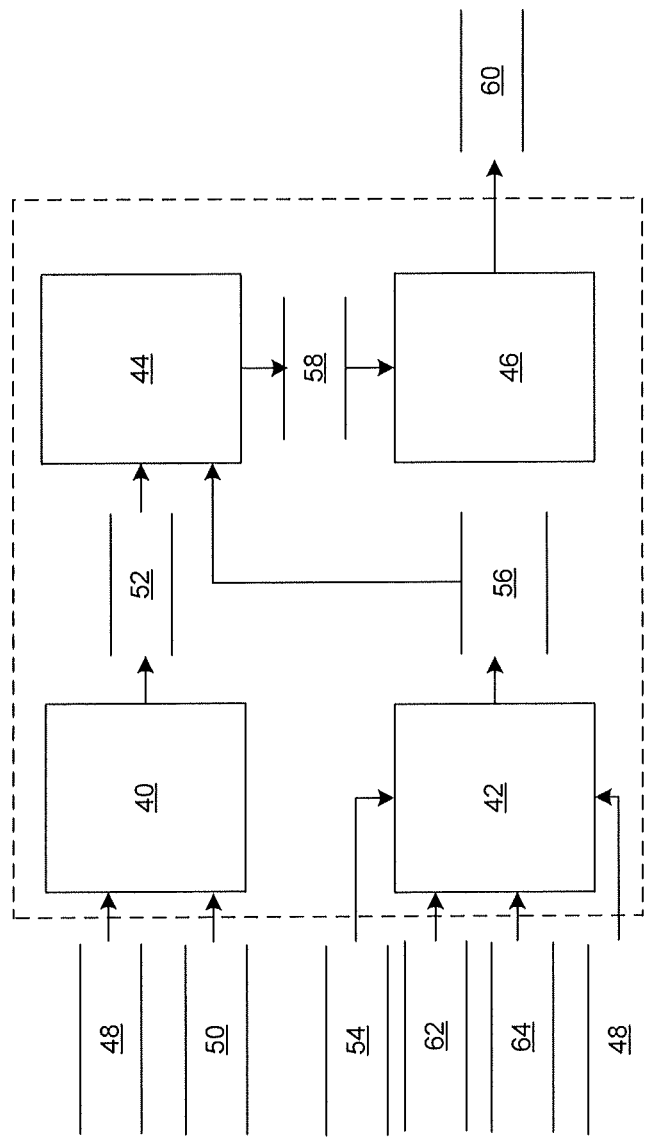
FIG. 2 is a dataflow diagram illustrating a control module of the exhaust treatment system in accordance with exemplary embodiments.

Referring now to FIG. 2, a dataflow diagram illustrates various embodiments of an SCR monitoring system that may be embedded within the control module 32. Various embodiments of SCR monitoring systems according to the present disclosure may include any number of sub-modules embedded within the control module 32. As can be appreciated, the sub-modules shown in FIG. 2 may be combined and/or further partitioned to similarly monitor the efficiency of the SCR 18 (FIG. 1). Inputs to the control module 32 may be sensed from the engine 14 (FIG. 1), received from other control modules (not shown), and/or determined/modeled by other sub-modules (not shown) within the control module 32. In various embodiments, the control module 32 includes an efficiency determination module 40, a threshold determination module 42, an evaluation module 44, and a reporting module 46.

The efficiency determination module 40 receives as input an upstream NOx concentration value 48 (e.g., determined by the upstream NOx sensor 34 shown in FIG. 1) and a downstream NOx concentration value 50 (e.g., determined by the downstream NOx sensor 36 shown in FIG. 1). Based on the upstream NOx concentration value 48 and the downstream NOx concentration value 50, the efficiency determination module 40 determines an efficiency 52 of the SCR 18 (FIG. 1). For example, the efficiency determination module 40 determines the efficiency 52 based on the following equation:

$$\text{Eff} = 1 - NOx\_DWN/NOx\_UP. \quad (1)$$

Where Eff represents the efficiency 52. NOx_DWN represents the measured concentration of NOx downstream (e.g., the downstream NOx concentration value 50). NOx_UP represents the measured concentration of NOx upstream (e.g., the upstream NOx concentration value 48).

The threshold determination module 42 receives as input, for example, a dosing adaptation value 54, a catalyst temperature 62 of the SCR 18, an exhaust gas flow rate 64, and the upstream NOx concentration value 48. The dosing adaptation value 54 represents an adjusted value of the supply of reductant based on a determined deviation of the measured downstream NOx concentration value 50 to a modeled or expected NOx concentration. For example, if it is determined that there is a large enough deviation in the measured downstream NOx concentration value 50 from a modeled NOx concentration, then an SCR adaptation is triggered. During SCR adaptation, the reductant supply is turned off and the reductant load on the SCR 18 (FIG. 1) is depleted. The response of the downstream NOx sensor 36 (FIG. 1) is monitored to determine if there has been an overdose of reductant, an under dose of reductant, or if no decision can be made. If there has been an overdose, the adaptation value 54 is decreased from a nominal value (e.g., if nominal is 1, adaptation will decrease the factor to 0.98 which reduces a dosing amount). If there has been an under dose, the adaptation value 54 is increased from the nominal value (e.g., if nominal is 1, adaptation will increase to 1.12 which increases a dosing amount).

The threshold determination module 42 determines an efficiency threshold 56 for the SCR 18 by adjusting an existing efficiency threshold value by the dosing adaptation value 54. The existing efficiency threshold value is based on the catalyst temperature 62 of the SCR 18, the exhaust gas flow rate 64, and the upstream NOx concentration value 48. For example, using the adaptation value 54, the efficiency determination module 42 determines an adaptation adjustment factor (e.g., using a lookup table or other method). The threshold determination module 42 applies the adaptation adjustment factor to an efficiency threshold (e.g., by multiplication or other method). In various embodiments, the efficiency threshold 56 can be predefined or determined based on emission standards.

The evaluation module 44 receives as input the efficiency 52 and the efficiency threshold 56. The evaluation module 44 compares the efficiency 52 with the efficiency threshold 56, to determine a pass/fail status 58. For example, when the efficiency 52 is greater than or equal to than the efficiency threshold 56, the pass/fail status is set to indicate a pass (e.g., zero or FALSE). When the efficiency 52 is less than the efficiency threshold 56, the pass/fail status is set to indicate a fail (e.g., to one or TRUE).

The reporting module 46 receives as input the pass/fail status 58. Based on the pass/fail status 58, the reporting module 46 sets the value of a diagnostic code associated with the SCR 18 (FIG. 1) and reports the diagnostic code. In various embodiments, the diagnostic code can be reported by generating a message 60 on a serial data bus (not shown) of the vehicle 10 (FIG. 1), where the message can be transmitted to a remote location using a telematics system (not shown) of the vehicle 10 (FIG. 1) or can be retrieved by a technician tool (not shown) connected to the vehicle 10 (FIG. 1).

Figure 3:
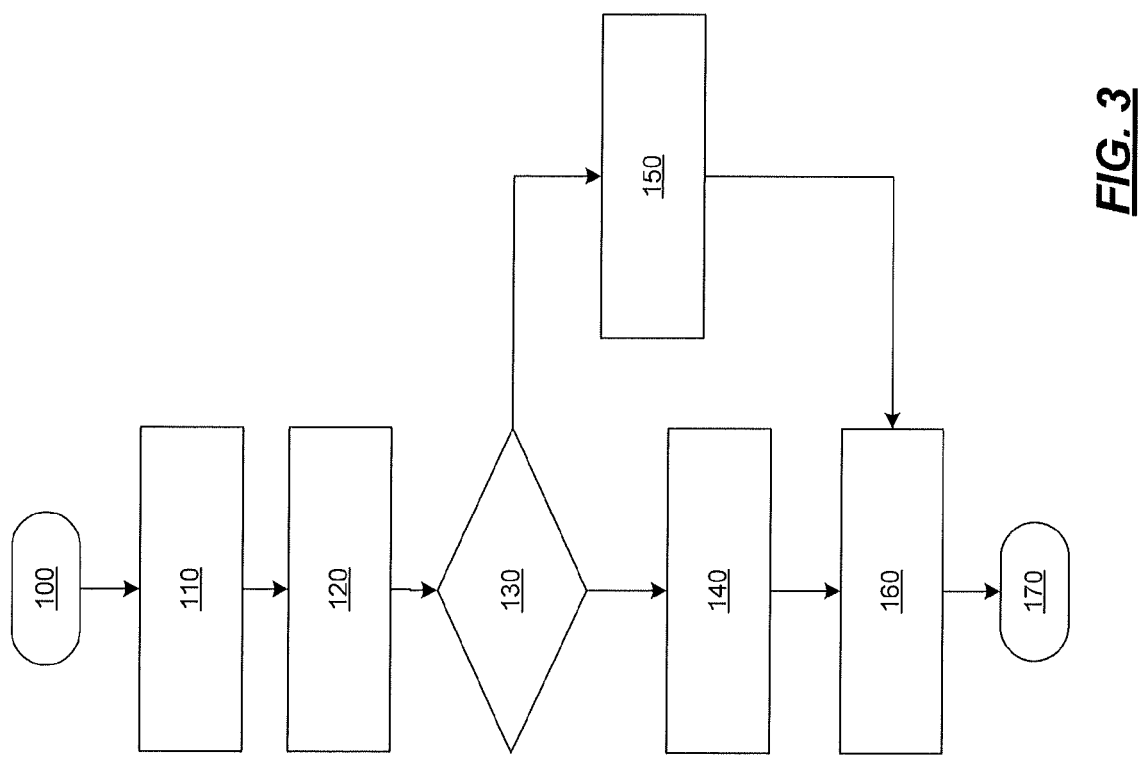
FIG. 3 is a flowchart illustrating a control method that can be performed by the exhaust treatment system in accordance with exemplary embodiments.

Referring now to FIG. 3, and with continued reference to FIGS. 1 and 2, a flowchart illustrates an SCR monitoring method that can be performed by the control module 32 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or run continually during operation of the engine 14.

In one example, the method may begin at 100. The efficiency 52 is determined based on the upstream NOx concentration value 48 and the downstream NOx concentration value 50 as discussed above at 110. The efficiency threshold 56 is determined based on the adaptation value 54 as discussed above at 120. The efficiency 52 and the efficiency threshold 56 are compared at 130. If the efficiency 52 is less than the efficiency threshold 56 at 130, the pass/fail status 58 is set to indicate fail at 140. If, however, the efficiency 52 is greater than or equal to the efficiency threshold 56 at 130, the pass/fail status 58 is set to indicate pass at 150. Thereafter, the diagnostic code is set and reported based on the pass/fail status 58 at 160, and the method may end at 170.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A control method for monitoring a selective catalytic reduction ("SCR") device, comprising:
    adjusting an existing efficiency threshold based on a dosing adaptation value to determine an efficiency threshold, wherein the dosing adaptation value represents an adjusted value of a supply of reductant based on a determined deviation of a downstream NOx concentration value to an expected NOx concentration;
    comparing the efficiency threshold with a determined efficiency of the SCR device; and
    generating a message based on comparing the efficiency threshold with the determined efficiency of the SCR device.

2. The control method in claim 1, wherein the existing efficiency threshold is based on at least one of a catalyst temperature of the SCR device, an exhaust gas flow rate, and an upstream NOx concentration value.

3. The control method in claim 1, wherein the determined efficiency is based on an upstream NOx concentration value and the downstream NOx concentration value.

4. The control method in claim 3, wherein the determined efficiency is calculated using the following equation:

$$Eff = 1 - NOx\_DWN/NOx\_UP$$

wherein Eff is the efficiency, NOx_DWN is a measured concentration of the downstream NOx concentration value, and NOx_UP is a measured concentration of the upstream NOx concentration value.

5. The control method in claim 1, comprising comparing the efficiency threshold with the determined efficiency of the SCR device to determine a pass status, wherein if the determined efficiency is greater than or equal to the efficiency threshold the pass status is set.

6. The control method in claim 1, comprising comparing the efficiency threshold with the determined efficiency of the SCR device to determine a fail status, wherein if the determined efficiency is less than the efficiency threshold the fail status is set.

7. The control method in claim 1, wherein the message corresponds with a diagnostic code that is associated with the SCR device.

8. A control system for monitoring a selective catalytic reduction ("SCR") device, comprising:
    a threshold determination module for adjusting an existing efficiency threshold based on a dosing adaptation value to determine an efficiency threshold, wherein the dosing adaptation value represents an adjusted value of a supply of reductant based on a determined deviation of a downstream NOx concentration value to an expected NOx concentration;
    an efficiency determination module for comparing the efficiency threshold with a determined efficiency of the SCR device; and
    a reporting module for generating a message based on comparing the efficiency threshold with the determined efficiency of the SCR device.

9. The control system in claim 8, wherein the existing efficiency threshold is based on at least one of a catalyst temperature of the SCR device, an exhaust gas flow rate, and an upstream NOx concentration value.

10. The control system in claim 8, wherein the determined efficiency is calculated by an efficiency determination module, and wherein the determined efficiency is based on an upstream NOx concentration value and the downstream NOx concentration value.

11. The control system in claim 10, wherein the determined efficiency is calculated using the following equation:

$$Eff = 1 - NOx\_DWN/NOx\_UP$$

wherein Eff is the efficiency, NOx_DWN is a measured concentration of the downstream NOx concentration value, and NOx_UP is a measured concentration of the upstream NOx concentration value.

12. The control system in claim 8, comprising comparing the efficiency threshold with the determined efficiency of the SCR device to determine a pass status, wherein if the determined efficiency is greater than or equal to the efficiency threshold the pass status is set.

13. The control system in claim 8, comprising comparing the efficiency threshold with the determined efficiency of the SCR device to determine a fail status, wherein if the determined efficiency is less than the efficiency threshold the fail status is set.

14. The control system in claim 8, wherein the message corresponds with a diagnostic code that is associated with the SCR device.

15. An exhaust treatment system, comprising:
    a selective catalytic reduction ("SCR") device; and
    a control module that monitors the SCR device, the control module comprising:
    a threshold determination module for adjusting an existing efficiency threshold based on a dosing adaptation value to determine an efficiency threshold, wherein the dosing adaptation value represents an adjusted value of a supply of reductant based on a determined deviation of a downstream NOx concentration value to an expected NOx concentration;
    an efficiency determination module for comparing the efficiency threshold with a determined efficiency of the SCR device; and
    a reporting module for generating a message based on comparing the efficiency threshold with the determined efficiency of the SCR device.

16. The exhaust treatment system in claim 15, wherein the existing efficiency threshold is based on at least one of a catalyst temperature of the SCR device, an exhaust gas flow rate, and an upstream NOx concentration value.

17. The exhaust treatment system in claim 15, wherein the determined efficiency is calculated by an efficiency determination module, and wherein the determined efficiency is based on an upstream NOx concentration value and the downstream NOx concentration value.

18. The exhaust treatment system in claim 17, wherein the determined efficiency is calculated using the following equation:

$$Eff = 1 - NOx\_DWN/NOx\_UP$$

wherein Eff is the efficiency, NOx_DWN is a measured concentration of the downstream NOx concentration value, and NOx_UP is a measured concentration of the upstream NOx concentration value.

19. The exhaust treatment system in claim 15, comprising comparing the efficiency threshold with the determined efficiency of the SCR device to determine a pass status, wherein if the determined efficiency is greater than or equal to the efficiency threshold the pass status is set.

20. The exhaust treatment system in claim 15, comprising comparing the efficiency threshold with the determined efficiency of the SCR device to determine a fail status, wherein if the determined efficiency is less than the efficiency threshold the fail status is set.

* * * * *